(12) United States Patent
Farmont

(10) Patent No.: US 6,264,270 B1
(45) Date of Patent: Jul. 24, 2001

(54) GUIDING MECHANISM FOR A VEHICLE SUNROOF CONSISTING OF AT LEAST TWO PANELS

(75) Inventor: Rolf Farmont, Dusseldorf (DE)

(73) Assignee: Meritor Automotive GmbH, Frankfurt (DE)

(*) Notice: Subject to any disclaimer, the term of this patent is extended or adjusted under 35 U.S.C. 154(b) by 0 days.

(21) Appl. No.: 09/377,086

(22) Filed: Aug. 19, 1999

(30) Foreign Application Priority Data

Aug. 22, 1998 (DE) .......................................... 298 15 104 U

(51) Int. Cl.$^7$ ..................................................... B60J 7/047
(52) U.S. Cl. ................ 296/223; 296/216.03; 296/220.01
(58) Field of Search ........................ 296/220.01, 216.03, 296/216.05, 223

(56) References Cited

U.S. PATENT DOCUMENTS

| 1,272,983 | 7/1918 | Menzo . |
| 1,387,062 | 8/1921 | Marshall . |
| 1,787,451 | 1/1931 | Mohun et al. . |

(List continued on next page.)

FOREIGN PATENT DOCUMENTS

| 208672 | 1/1957 | (AU) . |
| 571 641 | 1/1976 | (CH) . |
| 30 20 675 | 12/1981 | (DE) . |
| 31 16 641 | 11/1982 | (DE) . |
| 32 23 136 | 3/1983 | (DE) . |
| 33 11 428 | 10/1983 | (DE) . |
| 33 11 452 | 10/1983 | (DE) . |
| 33 16 739 | 1/1984 | (DE) . |
| 33 45 122 | 7/1984 | (DE) . |
| 34 16 176 | 11/1984 | (DE) . |
| 34 42 615 | 5/1986 | (DE) . |
| 34 42 631 | 5/1986 | (DE) . |
| 35 06 460 | 8/1986 | (DE) . |
| 35 36 184 | 5/1987 | (DE) . |
| 37 07 644 | 9/1987 | (DE) . |
| 37 15 268 | 1/1988 | (DE) . |
| 38 01 881 | 8/1988 | (DE) . |
| 38 02 379 | 8/1988 | (DE) . |
| 39 19 385 | 7/1990 | (DE) . |
| 39 03 035 | 8/1990 | (DE) . |
| 39 20 909 | 1/1991 | (DE) . |
| 39 30 756 | 3/1991 | (DE) . |
| 40 31 750 | 4/1991 | (DE) . |
| 41 23 229 | 1/1993 | (DE) . |
| 42 01 403 | 2/1993 | (DE) . |
| 93 02 762 | 5/1993 | (DE) . |
| 42 38 944 | 10/1993 | (DE) . |
| 42 27 400 | 2/1994 | (DE) . |
| 44 05 583 | 9/1994 | (DE) . |
| 43 29 583 | 10/1994 | (DE) . |
| 43 29 580 | 11/1994 | (DE) . |
| 44 04 618 | 3/1995 | (DE) . |

(List continued on next page.)

Primary Examiner—Dennis H. Pedder
(74) Attorney, Agent, or Firm—Vickers, Daniels & Young

(57) ABSTRACT

In a guiding mechanism for a vehicle sunroof (4) consisting of at least two panels (6, 8, 10, 12) with a roof-mounted frame (14) forming an essentially rectangular opening in the roof (3) of the vehicle, and with guiding rails (16, 17) that are positioned along the edges of the frame (14) that are essentially parallel with the driving direction of the vehicle, and with guiding carriages (18, 20, 22, 24) that can be moved back and forth in the guiding rails (16, 17), whereas the panels (6, 8, 10, 12) are connected at both ends with one guiding carriage (18, 20, 22, 24) each, the problem of little space requirement of the guiding mechanism is solved. This is accomplished in that the guiding carriages (18, 20, 22, 24) of two adjacent-positioned panels (6, 8, 10, 12) can be moved into positions in which the guiding carriages (18, 20, 22, 24) are at least partly positioned side-by-side with each other. Thus, a large maximal aperture of the vehicle sunroof is facilitated.

10 Claims, 8 Drawing Sheets

U.S. PATENT DOCUMENTS

Figure 1:
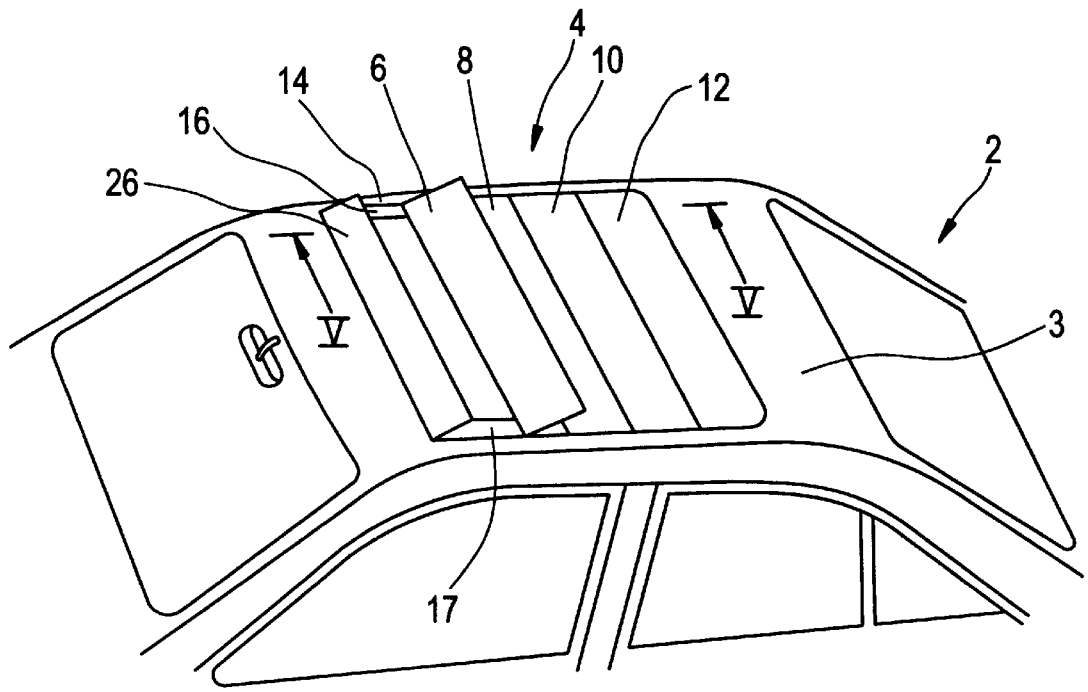

| | | | |
|---|---|---|---|
| 2,263,216 | * 11/1941 | Latchford | 296/220.01 |
| 2,338,309 | 1/1944 | Votpyka . | |
| 2,497,419 | 2/1950 | Schwartz . | |
| 2,516,702 | 7/1950 | Kagan . | |
| 2,853,340 | 9/1958 | Hershberger . | |
| 3,845,591 | 11/1974 | Stine . | |
| 3,906,669 | 9/1975 | Vorguitch . | |
| 4,068,699 | 1/1978 | Tucker . | |
| 4,286,821 | 9/1981 | Cooper . | |
| 4,403,805 | 9/1983 | Strem, Jr. et al. . | |
| 4,537,442 | 8/1985 | Jardin . | |
| 4,601,512 | 7/1986 | Boots . | |
| 4,609,222 | 9/1986 | Boots . | |
| 4,643,478 | 2/1987 | Boots . | |
| 4,647,105 | 3/1987 | Pollard . | |
| 4,699,421 | 10/1987 | Schaetzler et al. . | |
| 4,741,572 | 5/1988 | Bauhof . | |
| 4,852,938 | 8/1989 | Hirshberg et al. . | |
| 4,893,868 | 1/1990 | Miller et al. . | |
| 4,936,623 | 6/1990 | Huyer . | |
| 4,982,995 | 1/1991 | Takahashi . | |
| 5,026,113 | 6/1991 | DiCarlo et al. . | |
| 5,100,197 | 3/1992 | Ichinose et al. . | |
| 5,197,779 | 3/1993 | Mizuno et al. . | |
| 5,287,655 | 2/1994 | Harvey . | |
| 5,335,961 | 8/1994 | Reinsch et al. . | |
| 5,362,122 | 11/1994 | Reihl et al. . | |
| 5,421,635 | 6/1995 | Reinsch et al. . | |
| 5,447,355 | 9/1995 | Kelm . | |
| 5,484,185 | 1/1996 | Salz et al. . | |
| 5,603,372 | 2/1997 | Farmont et al. . | |
| 5,630,641 | * 5/1997 | Mori et al. | 296/224 |
| 5,632,523 | 5/1997 | Kelm . | |
| 5,671,969 | 9/1997 | Sutor et al. . | |
| 5,765,908 | 6/1998 | Kelm . | |
| 5,816,647 | 10/1998 | Farmont . | |

FOREIGN PATENT DOCUMENTS

| | | | |
|---|---|---|---|
| 44 15 649 | 6/1995 | (DE) . | |
| 44 07 286 | 1/1996 | (DE) . | |
| 195 03 786 | 8/1996 | (DE) . | |
| 196 08 916 | 4/1999 | (DE) . | |
| 0 403 388 | 12/1990 | (EP) . | |
| 0 556 420 | 8/1993 | (EP) . | |
| 0 608 869 | 8/1994 | (EP) . | |
| 2 591 953 | 6/1987 | (FR) . | |
| 349172 | * 5/1931 | (GB) | 296/220.01 |
| 573355 | 11/1945 | (GB) . | |
| 8 802 552 | 5/1990 | (NL) . | |

* cited by examiner

GUIDING MECHANISM FOR A VEHICLE SUNROOF CONSISTING OF AT LEAST TWO PANELS

The invention concerns a guiding mechanism for a vehicle sunroof consisting of at least two panels with a roof-mounted frame that form an essentially rectangular opening in the vehicle roof with guiding rails that are located on the longitudinal edges of the frame that are essentially parallel with the driving direction of the vehicle and with guiding slides (or carriages) that can be moved forward and backward in the guiding rails, whereas the panels at both ends are connected with one of the guiding carriages each and whereas, preferably, the guiding rails feature at least two parallel guiding tracks.

Such a guiding mechanism is known from the state of the art of DE 41 23 229 A1, whereby several guiding carriages are located along a guiding rail so they can be moved. Each guiding rail features a multitude of oblong connecting link guides and each guiding carriage features recesses so that a sliding block located in a connecting link guide can engage one of the recesses of the guiding carriage. In this manner one guiding carriage is guided via a sliding block in the multitrack connecting link guide. The sliding blocks are disengaged from a drive shaft at varying distances from the forward edge of the opening in the vehicle roof so that the guiding carriages rest in their respective positions. In a fully opened condition the guiding carriages are lined up one behind the other touching each other.

Similar configurations of several guiding carriages in one and the same guiding rail are known from GB 2 258 848 A, DE 44 15 649 C1 and DE 196 08 916 C1, whereas the guiding carriages in the fully opened condition of the sunroof are all located one behind the other. Because of the leverage involved between the upwardly tilted panels and the guiding carriages, a sufficient length of the guiding carriages is required in order to prevent vibrations from occurring that are caused by forces of the wind blast with the panels tilted upward. It follows from the known state of the art of configurations of guiding carriages that the maximal aperture of the sunroof is limited by the combined length of the guiding carriages when they touch each other. In order to minimize this combined length in particular, DE 44 15 649 proposes supporting the up-slanted panels against each other under the condition of short-length guiding carriages. Only through this additional mechanical effort are the panels sufficiently stabilized.

Additionally, the guiding mechanisms known as the state of the art have in common that the panels are slanted upwards, each at the same maximal angle. This is based on the use of the same adjustment mechanisms for each panel in order to make smallest spatial dimensions possible for the guiding mechanism. If different angle positions are to be made possible, the space requirement of the corresponding adjustment mechanisms is considerable.

Therefore, the invention is based on the problem of configuring and developing the guiding mechanism for a vehicle sunroof as it is known from the state of the art in such a manner that the guiding mechanism requires little space and thus facilitates a large maximal aperture of the vehicle sunroof.

The aforementioned technical problem is solved in that the guiding carriages of two adjacent panels can be moved into positions in which the guiding carriages are at least partially positioned side by side and the guiding carriages of two adjacent panels, preferably, are positioned each in different guiding tracks.

According to the invention, it has thus been recognized that by laterally offsetting two guiding carriages that each support adjacent panels, the guiding carriages are positioned side by side in particular in the fully open position so that the adjacent guiding carriages are not positioned behind each other and touching each other. In this manner, the maximal aperture of the vehicle sunroof is not limited by the combined length of all of the guiding carriages. Rather, the up-slanted panels are positioned at a distance from each other that is significantly shorter than the length of a guiding carriage. In this way, a significantly larger maximal aperture of the vehicle sunroof has been accomplished in comparison with the state of the art.

The vehicle sunroof features a sequence of panels for the optional closing or continuous opening of the aperture in the vehicle roof, whereas the panels in the closed position are contiguous and form a composite. When the composite is opened first the most forward panel slants upward and is then pushed backward. Subsequently the following panel is slanted upward and pushed backward together with the first panel. This process continues until all panels are slanted upward and have been moved backwards as far as possible. The closing of the vehicle roof occurs in the reverse sequence, whereby the individual panels are moved into their closing positions and the panels can be swung back into the plane of the vehicle roof.

The idea on which the invention is based on the one hand consists in realizing through the guiding carriage a lever arm that is sufficient for the stability of the up-slanted panels and on the other hand in positioning the guiding carriages side by side in order to attain a maximal aperture of the vehicle sunroof. Notwithstanding the aforementioned configuration of the invention with the adjacent guiding carriages positioned side by side in different guiding tracks, the task described above can also be solved by positioning the guiding carriages of adjacent panels that are positioned movably in one and the same guiding track and that feature extension elements that are supported by a surface outside the guiding track. In this manner, the entire guiding carriage including the extension element is not contained in the guiding track and the extension element can, by resting on a corresponding surface, absorb the leverage exerted by the panel. If the extension element and the part of the guiding carriage that is contained in the guiding track are now positioned in a staggered formation, adjacent guiding carriages can touch each other, whereas the extension element of the first guiding carriage is positioned to the side of the part of the second guiding carriage that is contained in the guiding track. In this manner, a compact configuration of the guiding carriages is achieved, whereas the combined length of the contiguous guiding carriages is less than the combined length of all of the guiding carriages including the extension elements. In this fashion and in spite of the use of only one guiding track, the same advantage is achieved as in the above-discussed configuration variant of the present invention so that a maximal aperture of the vehicle sunroof is accomplished and so that, at the same time, a sufficient stability of the panels is guaranteed.

Each panel, in a preferred configuration of the invention, features a separate swiveling mechanism that is independent from the swiveling mechanism of the other panels. Through the alternating staggered positioning of the guiding carriages, the larger space required for this is compensated so that in spite of independent adjusting mechanisms for the individual panels, a large maximal aperture of the vehicle sunroof is accomplished. Additionally, the advantage is provided that the panels in the open position can be slanted upward at different angles without increasing the space requirement.

Because of the staggered positioning of the guiding carriages, coupling links between the individual guiding carriages are provided in a preferred configuration. For this purpose, coupling elements are proposed, the configuration of which, independently from the staggered positioning of the guiding carriages, has an inventive character.

According to this technical arrangement of the present invention, coupling elements are provided that function between the guiding carriages that are positioned in one and the same guiding track; i.e., not between each of the two guiding carriages of the two adjacent panels. The coupling elements consist on the one hand of recesses and on the other hand of engaging elements, and they engage each other as a consequence of being pushed together when the sunroof is opened. The coupling elements disengage at the predetermined positions when the sunroof is closed as a consequence of being pulled apart. For this purpose, preferably a forward first guiding carriage is provided that is connected with a drive cable, which engages with all guiding tracks at least partly and features recesses for engaging elements of each following guiding carriage in each guiding track. Additionally, a recess that is positioned at the backside of a forward guiding carriage and a protruding elastic engaging element that is positioned on the front side of the following backward guiding carriage are provided. If in one guiding track two adjacent guiding carriages, i.e. two guiding carriages that are positioned one behind the other, contact each other, the elastic engaging element of the backward guiding carriage engages the corresponding recess of the corresponding forward guiding carriage.

Additionally, the invention proposes the inclusion of coupling elements that function between the guiding carriages of adjacent panels, whereas the guiding carriages are positioned in different guiding tracks. For this purpose, a link is provided that is positioned on the backside of a forward guiding carriage and that engages at least partially in the guiding track in which the following guiding carriage is positioned featuring a recess. Again, a protruding elastic engaging element is provided on the front side of the following backward guiding carriage. In a similar manner as described before, the elastic engaging element engages the recess in the preceding guiding carriage as soon as the link of the forward guiding carriage touches the front side of the backward guiding carriage.

Figure 2:
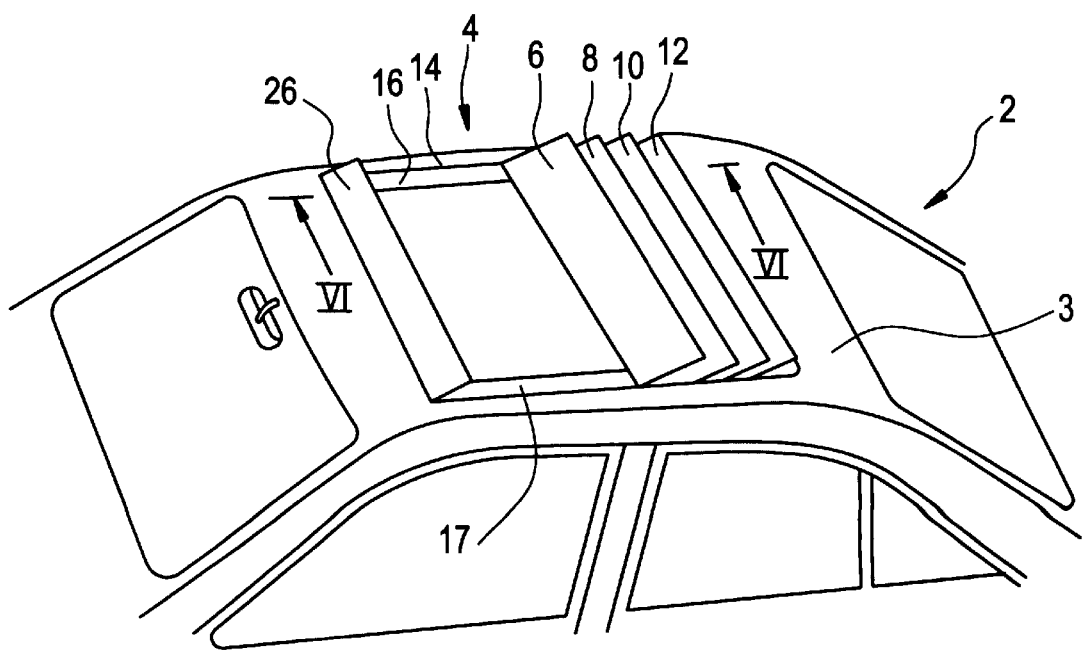
Figure 3:
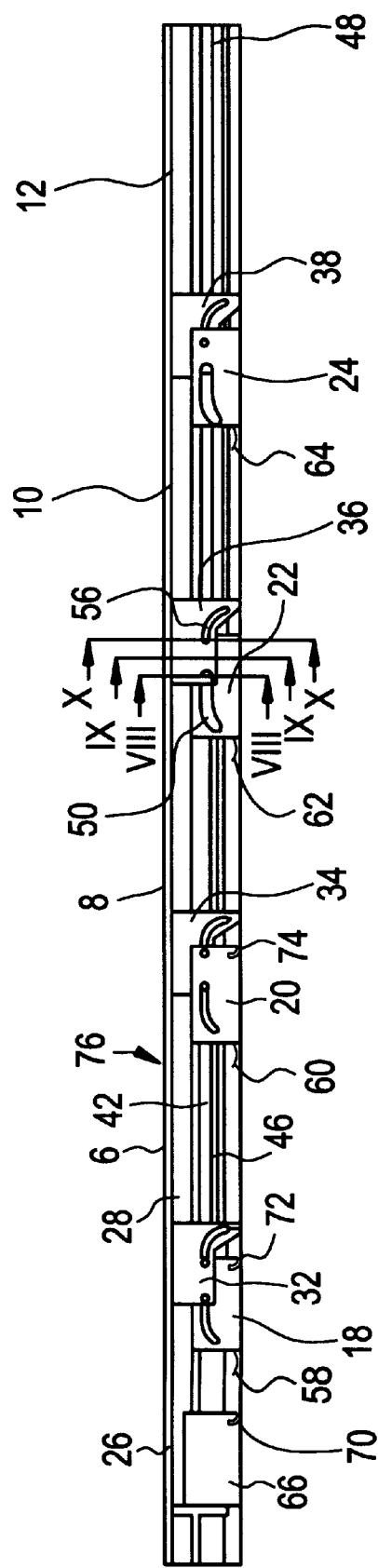
Figure 4:
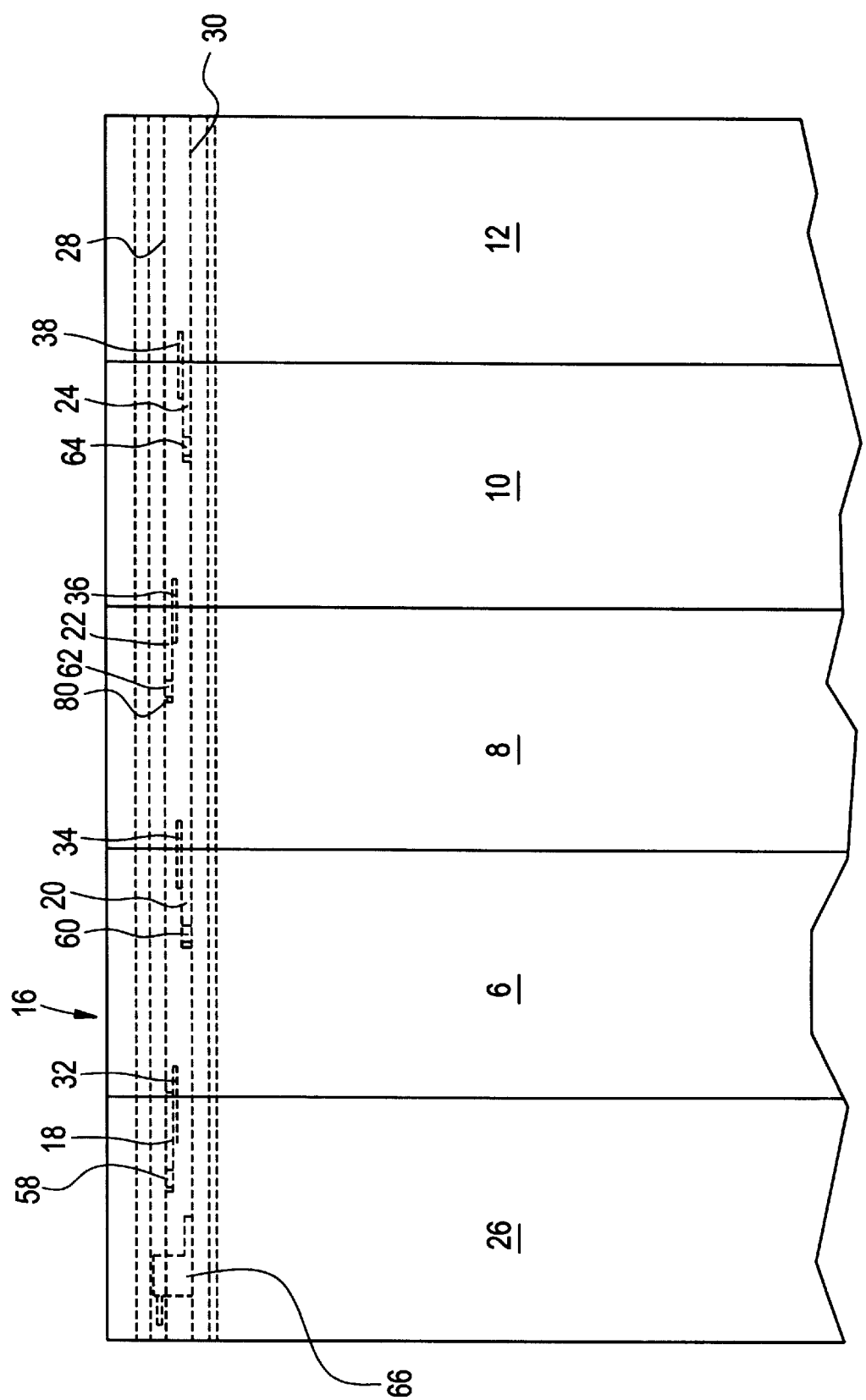
Figure 5:
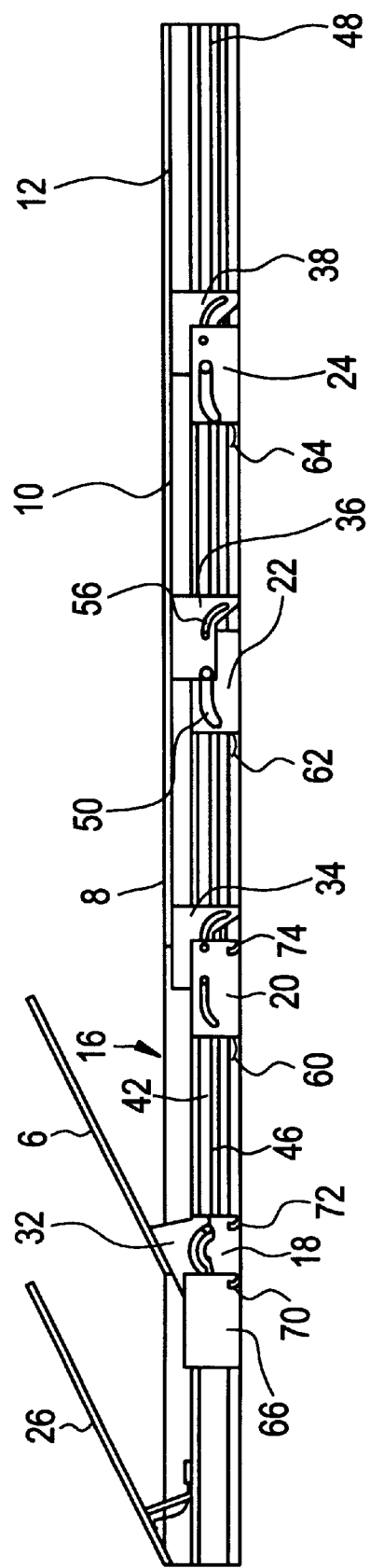
Figure 6:
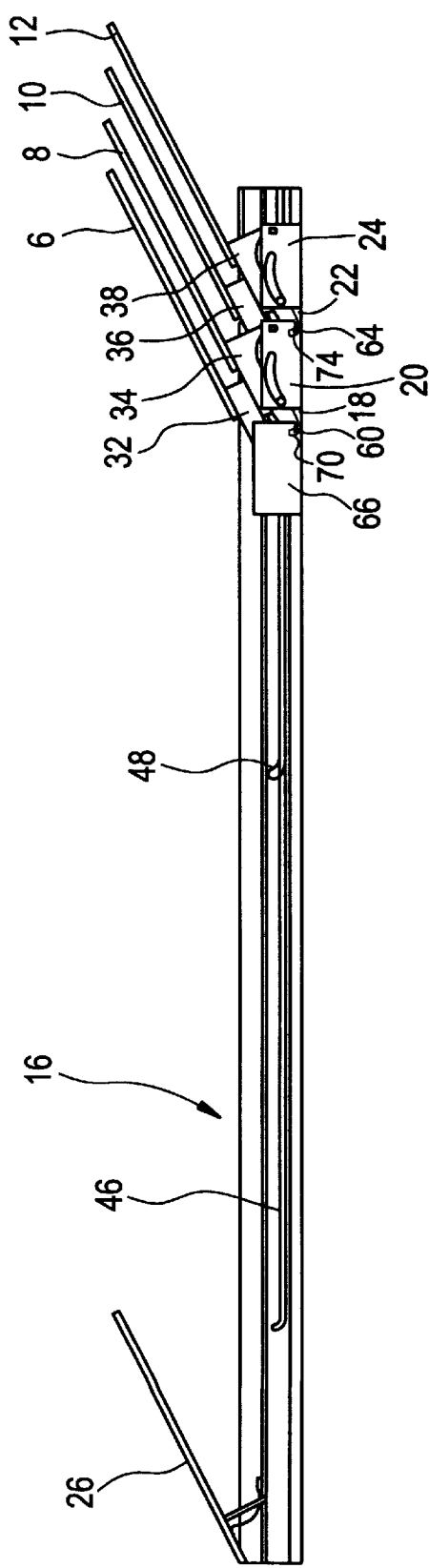
Figure 7:
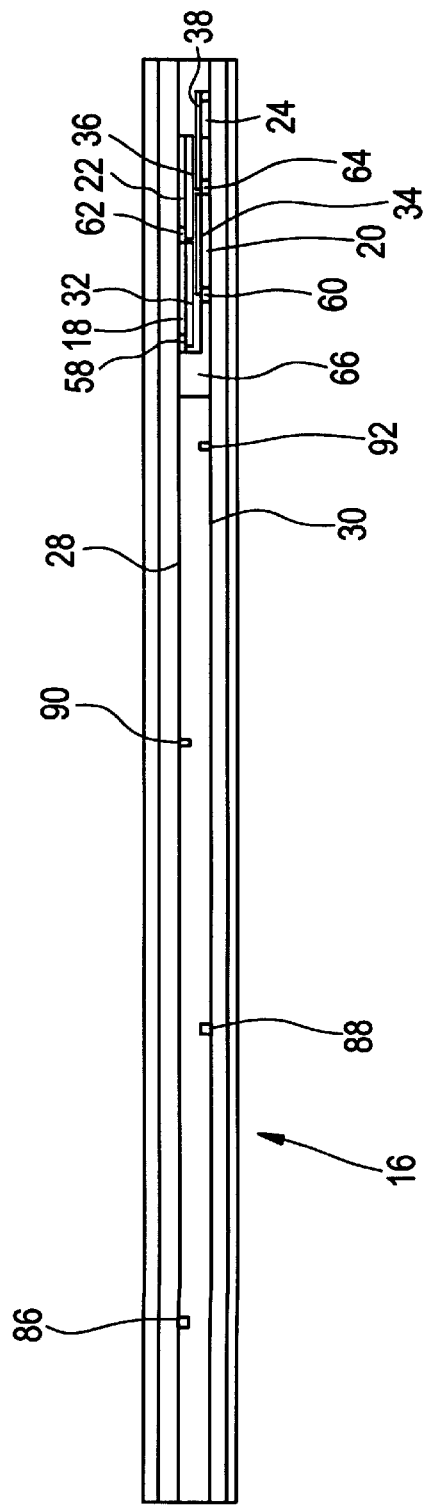

The aforementioned and claimed construction components as well as those that have been described in the embodiments and are used according to the invention are not subject to special exceptional conditions as concerns their size, configuration, material selection and technical design so that the selection criteria of the field of application can be applied without limitation. Additional details, characteristics and advantages of the subject of the invention are apparent from the following description of the pertinent drawing, in which—as examples—preferred configuration variants of the invention are illustrated. The drawings show:

FIG. 1 a vehicle sunroof with a guiding mechanism according to the invention in perspective view showing a partially open vehicle sunroof, FIG. 2 the vehicle sunroof shown in FIG. 1 in its fully open condition, FIG. 3 the guiding mechanism in a closed vehicle sunroof in a cross-sectional side view, FIG. 4 the guiding mechanism according to FIG. 3 in a closed vehicle sunroof in plan view, FIG. 5 the guiding mechanism shown in FIG. 3 in a partially opened vehicle sunroof—view V—V in FIG. 1, FIG. 6 the guiding mechanism shown in FIG. 3 in a fully open vehicle sunroof—view VI—VI in FIG. 2, FIG. 7 the guiding mechanism shown in. FIG. 4 in a fully open vehicle sunroof, FIG. 8 a guiding carriage in cross section along the line VIII—VIII in FIG. 3, FIG. 9 the guiding carriage in cross section along the line IX—IX in FIG. 3 and FIG. 10 the guiding carriage in cross section along the line X—X in FIG. 3.

In FIGS. 1 and 2 a vehicle 2 is shown with a vehicle sunroof 4 that features four panels 6, 8, 10, 12 that can be moved in the longitudinal direction of the vehicle 2. Panels 6 through 12 are positioned within a roof-mounted frame 14 that form an essentially rectangular opening in the roof 3 of the vehicle 2. Additionally, guiding tracks 16 and 17 are provided that are positioned on the longitudinal edges of the frame 14 that run essentially parallel with the driving direction of the vehicle. Both ends of panels 6 through 12 are connected with one each of the guiding carriages 18, 20, 22, and 24 (FIGS. 3 through 7), and the guiding carriages 18 through 24 are positioned in the guiding rails 16 and 17 so they can be moved back and forth. Lastly, the vehicle sunroof 4 features a panel that cannot be shifted but that pivots and is configured as an air deflector 26 that is positioned on the forward edge of frame 14.

Two different opening conditions of the vehicle sunroof 4 are illustrated in FIGS. 1 and 2. In FIG. 1, the vehicle sunroof 4 is only opened far enough that the air deflector 26 is slanted upward in relation to the vehicle roof 3 and that the first panel 6 is also slanted upward relative to the vehicle roof 3 and has moved in the backward direction opposite the driving direction of the vehicle, while the backward panels remain in the completely closed positions. By comparison, the vehicle sunroof 4 shown in FIG. 2 is in its maximal open condition with all panels 6, 8, 10 and 12 slanted upward and backward as far as possible relative to the vehicle roof opposite the driving direction. The guiding mechanism of the present invention that makes this position possible is explained in more detail with FIGS. 3 through 10.

In FIGS. 3 and 4, the configuration of the guiding carriages 18–24 is shown with the corresponding panels 6–12 and with the air deflector 26 for the closed position of the vehicle sunroof 4. In the plan view in FIG. 4 it can be seen that the guiding rail 16 features two parallel guiding tracks 28 and 30. According to the invention, the guiding carriages 18/20, 20/22 and 22/24 of two adjacent panels 6/8, 8/10 and 10/12 each are alternatingly positioned in both guiding tracks 28 and 30. In other words, the guiding carriages 18 and 22 are positioned in guiding track 28 and the guiding carriages 20 and 24 are positioned in guiding track 30, as seen in FIG. 4.

In FIGS. 6 and 7, the sunroof is shown in its fully open position. In FIG. 7 it can be seen that the guiding carriages 18–24 can be moved into positions in which the guiding carriages 18, 22, and 20, 24 are at least partially positioned side by side. The embodiment shows that the guiding carriages 18 and 22 positioned in guiding track 28 as well as the guiding carriages 20 and 24 in guiding track 30 touch each other, whereas the pairs of the guiding carriages 18, 22 and 20, 24 are positioned staggered against each other by essentially half the length of a guiding carriage 18 through 24. This guarantees the tight configuration of the panels 6–12 that are slanted upward relative to the vehicle roof, as shown in FIG. 6. With the described guiding mechanism, a maximal aperture of the vehicle sunroof 4 is guaranteed with minimal required space.

As is further shown in FIGS. 3–7, the panels 6–12 are connected with the guiding carriages 18–24 by way of the pivoting elements 32, 34, 36 and 38. The panels 6–12 are permanently attached to the pivoting elements 32–38, while the pivoting elements 32–38 are connected, via a separate connecting link each, to the guiding carriages 18–24 in a manner that permits them to pivot. By moving the guiding carriages 18 through 24 in the backward direction of the vehicle, i.e. from the left to the right in FIGS. 3–7, the pivoting elements 32–38 are forced by the connecting link to conduct a pivoting movement so that the panels 6–12 are positioned as predetermined in a predetermined angle relative to the vehicle roof 3.

Figure 8:
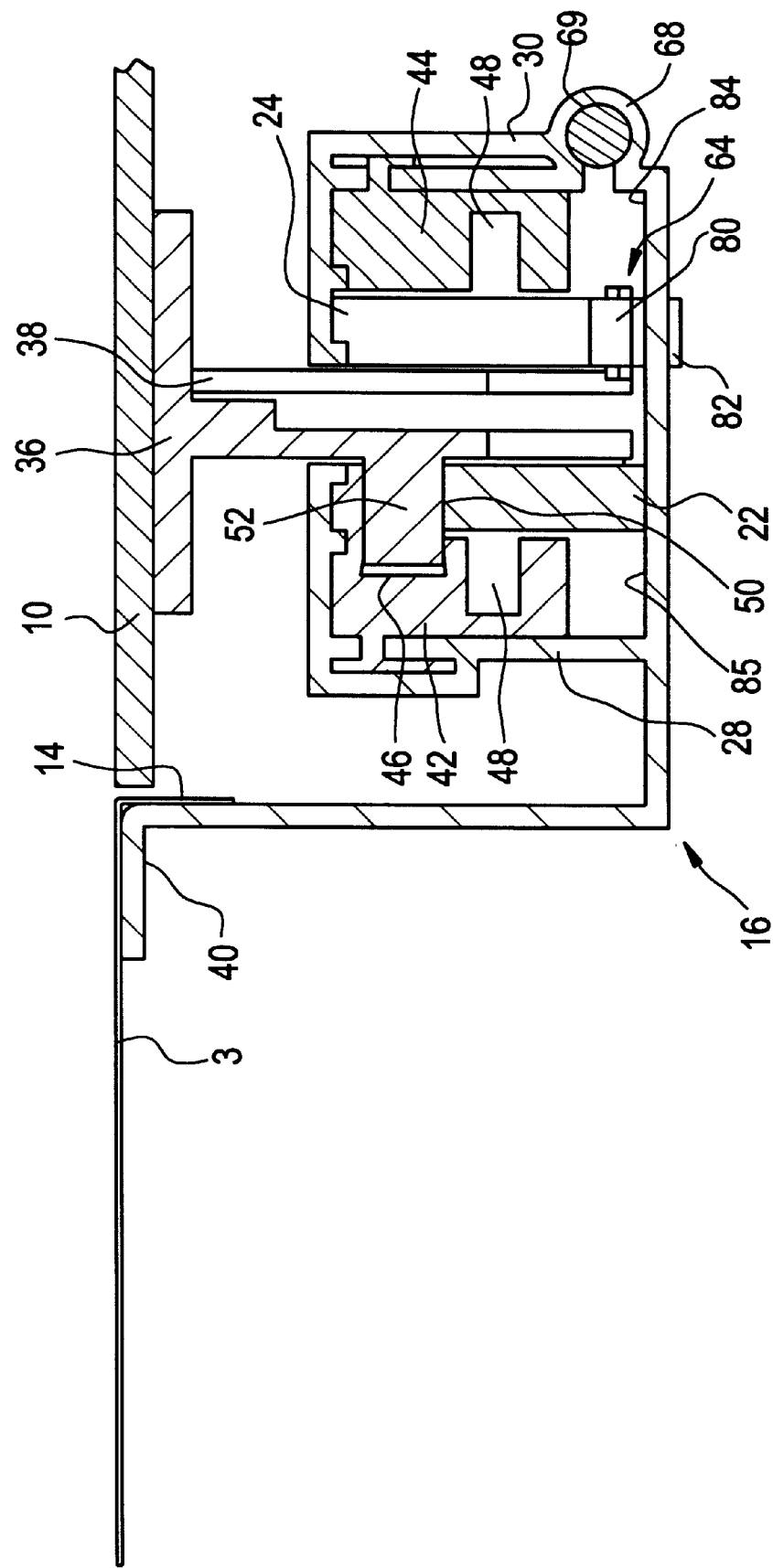
Figure 9:
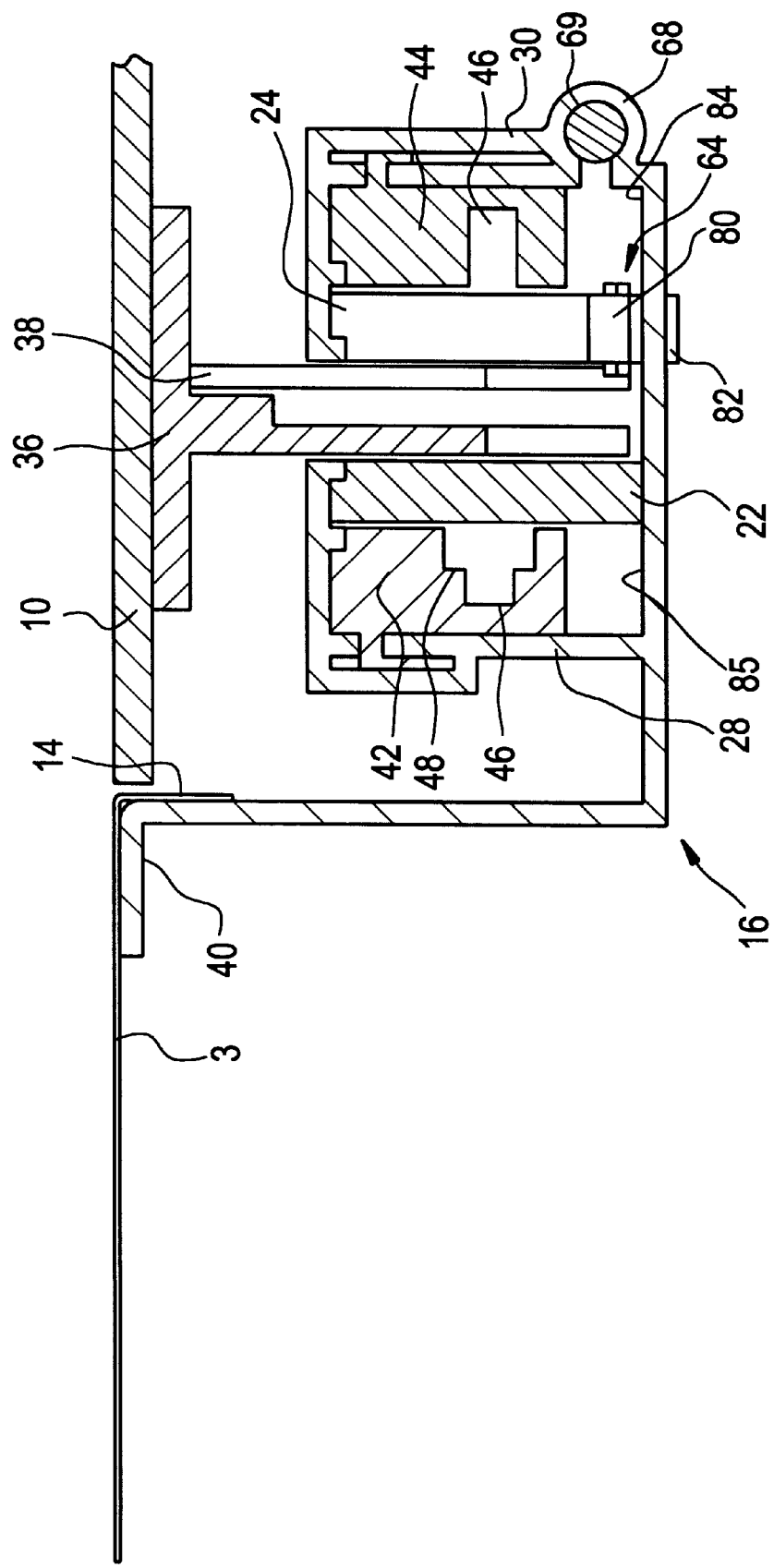
Figure 10:
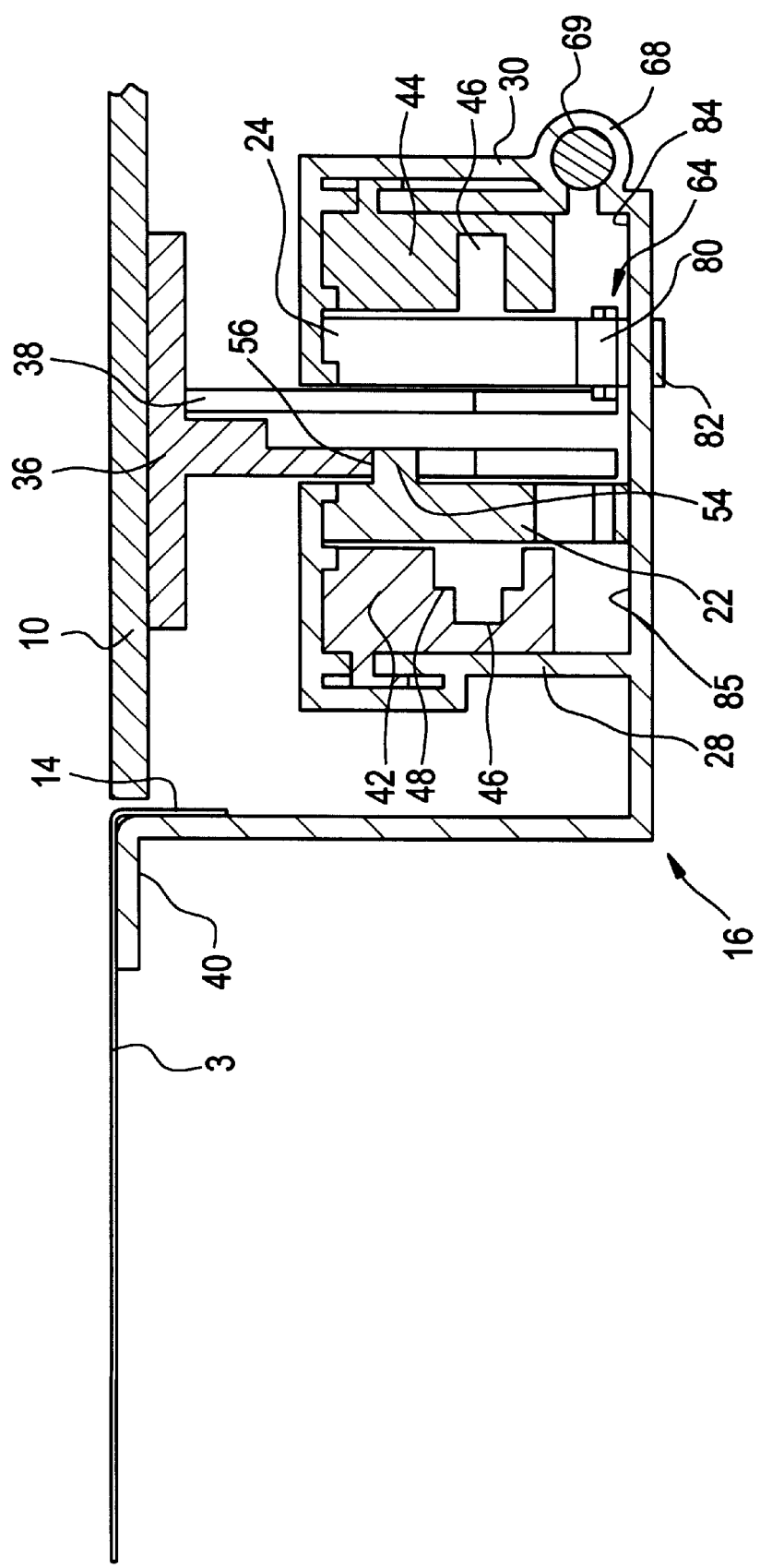

In the following, the connecting link is described in detail with particularly FIGS. 8–10 serving as reference. FIGS. 8–10 each show a cross section at the positions marked in FIG. 3 with VIII, IX and X. The guiding rail 16 is connected with the vehicle roof 3 along an edge 40 that is configured as an angle along the frame 14. The guiding rail 16 further features two essentially symmetrically configured areas that are parallel with each other and that form the two guiding tracks 28 and 30 that are positioned opposite each other. In each of the guiding tracks 28 and 30 oblong connecting link elements 42 and 44 are positioned that are e.g. made out of plastic and in which for each guiding carriage 18/22 or 20/24 a connecting link guide 46 or 48 is provided. The extension of the connecting link guides 46 and 48 can be best seen in FIG. 6.

In FIGS. 8–10, using the guiding carriage 22 as an example the precise construction and functioning of the connecting link element 42, of the guiding carriage 22 and of the pivoting element 36 are described. The guiding carriage 22 is adjacent to the connecting link element 42 in the guiding track 28, positioned along the connecting link element 42 in a manner that makes it movable back and forth. Guiding carriage 22 features a connecting link guide 50 and it can be seen in FIGS. 3, 5 and 8. As further shown in FIG. 8, the pivoting element 36 that is permanently attached to the panel 10 is located on the side of the guiding carriage 22 that faces the connecting link element 42. The pivoting element 36 features an integrally configured sliding block 52 that extends through the connecting link guide 50 of the guiding carriage 22 to connecting link guide 46 that is part of the connecting link element 42 and with which it engages.

As shown in FIG. 10, the guiding carriage 22 features a second sliding block 54 that is integrally configured offset toward the back and that engages a connecting link guide. 56 that is configured within the pivoting element 36. The shape and form of the connecting link guide 56 can be seen in FIGS. 3, 5 and 6.

In the closed position, the first sliding block 52 of the pivoting element 36 is located in the forward and upward pointing end of the connecting link guide 48 so that through the interaction between the second sliding block 54 and the connecting link guide 56, the pivoting element assumes an essentially horizontal position. Panel 10 that is attached to the pivoting element is thus positioned in an essentially horizontal position. At the beginning of the backward adjustment of the guiding carriage 22 the first sliding block 52 is moved downward by connecting link guide 48, which generates a relative movement between the pivoting element 36 and the guiding carriage 22, during which, due to the form of the connecting link guide 50, the front end of the pivoting element 36 is adjusted downward. Simultaneously, due to the interaction between the second sliding block 54 and the connecting link guide 56 the back end of the pivoting element is adjusted upward moving the panel 10 that is attached to pivoting element 36 into an upwardly slanting position at a predetermined angle. Maintaining this upwardly slanted position, panel 10 is further moved in the backward direction due to the movement of the guiding carriage 22. This is guaranteed by the long section of the connecting link guide 48 that runs essentially parallel with the frame 14 or with the guiding rail 16.

When the sunroof is closed, guiding carriage 22 is moved again into the position shown in FIG. 3, and as a result of the interaction between the sliding blocks 52 and 54 with the connecting link guides 48 and 50, the pivoting element 36 and accordingly panel 10 are moved into the closed position again.

From the aforementioned description of the pivoting mechanism for each of the panels 6–12, it results that the mode of slanting the panels 6–12 upward and the angle can be individually set independently of the other panels for any guiding carriage 18–24. This means that for each of the panels 6–12, a different slanting angle is possible in the open position. Through this, advantages can be gained for the aerodynamics and also for the appearance of the opened vehicle sunroof in that, e.g., the slanting angle of the individual panels 6–12 can be selected to ascend from the front panel 6 to the back panel 12. The individually selectable slanting mechanism for each of the panels 6 through 12, however, does not limit the maximal possible aperture of the vehicle sunroof, since—as described earlier—in the open condition, the guiding carriages 18/22 and 20/24 are positioned side by side in the two adjacent guiding tracks 28 and 30.

In the following, the coupling between the guiding carriages 18/22 respectively 20/24 in the open condition and the coupling between guiding carriages 18–24 with the guiding tracks 28 and 30 in the closed condition are described in detail. In the embodiment shown in the FIGS. 3–7, coupling elements are provided that engage when the vehicle sunroof 4 is compacted by sliding during the opening process and that disengage at the provided positions when the vehicle sunroof 4 is stretched by sliding during the closing process. For this purpose, each coupling element features recesses 70, 72, 74 and engaging elements 58, 60, 62, 64.

Further, a first front guiding carriage 66 is provided for the opening and closing of the vehicle sunroof. This guiding carriage 66 is connected with a drive cable 69 that runs through a channel 68 (see FIGS. 8–10). The drive cable 69 is connected with an adjusting mechanism inside the vehicle so that the vehicle sunroof 4 can be opened and closed by the user.

The forward first guiding carriage 66 engages in both guiding tracks 28 and 30, as shown in FIGS. 4 and 7. In addition, the forward first guiding carriage 66 features two recesses 70 with which the engaging elements 58 and 60 (described in more detail below) of the following guiding carriages 18 and 20 of each guiding track 28 and 30 engage thus implementing the coupling. Aside from the recesses 70 in the guiding carriage 66, the guiding carriages 18 and 20 feature recesses 72 and 74 in the back that face in the driving direction, whereas the recesses 70 through 74 are configured in a similar fashion.

The engaging elements 58–64 are configured as leaf springs at the front side of the guiding carriages 18–24.

As is shown in FIGS. 8–10 in the guiding track 30 on the right side in a front view and schematically in FIGS. 3, and 6 as a side view, the engaging element 64 features a front end 80 that protrudes upward. Further, the engaging element 64 features a downward-directed catch nose 82 and touches under prestress the bottom surface 84 of the guiding track 30. In the position of the vehicle sunroof shown in FIGS. 3 or 8–10, the catch nose 82 engages a notch 92 in the bottom surface 84 of the guiding track 30 through which the coupling between the guiding carriage 24 with the guiding track 30 is implemented. Further recesses 86, 88 and 92 configured for the guiding carriages 18, 20 and 22 in the bottom surfaces 64 and 65 of the corresponding guiding tracks 28 and 30 in particular are shown in FIG. 7.

The front end 80 of the engaging element 64 engages the recess 74 of the guiding carriage 20 when the vehicle sunroof is compacted during the opening process. The engaging element 64 that is configured as a leaf spring is lifted up when the guiding carriage 20 is pushed backwards, i.e., up to the niveau of the bottom surface 84 of the guiding track 30. The catch nose 82 now no longer engages the recess 92. When the vehicle sunroof 4 is closed and the guiding carriages 20 and 24 are pulled apart, the protruding end of the engaging element 64 engages the recess 92 in the predefined position with the catch nose 82 and the protruding end 80 disengages the recess 78.

Coupling elements 58 and 64 are configured in a similar fashion in order to function between two guiding carriages 18–24 or 66.

Since the configuration of the coupling elements that has been described in detail is independent of the configuration of the guiding mechanism with guiding carriages in different guiding tracks, the configuration of the coupling elements possesses its own independent inventiveness.

Having thus described the invention, it is claimed:

1. A guiding mechanism for a vehicle sunroof having at least two pivotable panels including:
   a roof-mounted frame forming a generally rectangular opening in the roof of the vehicle,
   guiding rails that are positioned along the edges of the frame and are generally parallel with the driving direction of the vehicle, and
   guiding carriages that can be moved back and forth in the guiding rails, whereas the panels have laterally spaced ends and are connected at both said ends with one guiding carriage each,
   the improvement comprising a pivoting mechanism is provided that is attached to the guiding carriage for the purpose of slanting said panels upward relative to the vehicle roof while the guiding carriages of two adjacent-positioned panels can be moved into positions in which the guiding carriages are at least partly positioned side-by-side with each other.

2. The guiding mechanism of claim 1, wherein the guiding rails feature at least two parallel guiding tracks, and the guiding carriages of said two adjacent-positioned panels are each positioned in a different one of said guiding tracks.

3. A guiding mechanism for a vehicle sunroof having at least two panels including:
   a roof-mounted frame forming a generally rectangular opening in the roof of the vehicle,
   guiding rails that are positioned along the edges of the frame and are generally parallel with the driving direction of the vehicle,
   guiding carriages that can be moved back and forth in the guiding rails, whereas the panels have laterally spaced ends and are connected at both said ends with one guiding carriage each,
   the improvement comprising the guiding carriages of two adjacent-positioned panels can be moved into positions in which the guiding carriages are at least partly positioned side-by-side with each other, coupling elements are provided that function between the guiding carriages that are positioned in said guiding rails, engaging as a result of the compaction when the vehicle sunroof is opened and disengaging at predetermined positions as result of being pulled apart when the vehicle sunroof is closed.

4. The guiding mechanism of claim 3, wherein a forward first guiding carriage is provided that is connected with a drive cable, engages all guiding tracks at least partially and features recesses for each said coupling element of the following guiding carriage of each guiding track.

5. The guiding mechanism of claim 4, wherein a recess that is positioned in the back side of a front guiding carriage and a protruding elastic engagement element in the front side of the subsequent backward guiding carriage are provided.

6. The guiding mechanism of claim 3, wherein a recess that is positioned in the back side of a front guiding carriage and a protruding elastic engagement element in the front side of the subsequent backward guiding carriage are provided.

7. A guiding mechanism for a vehicle sunroof having at least two panels including:
   a roof-mounted frame forming a generally rectangular opening in the roof of the vehicle,
   guiding rails that are positioned along the edges of the frame and are generally parallel with the driving direction of the vehicle, and
   guiding carriages that can be moved back and forth in the guiding rails, whereas the panels have laterally spaced ends and are connected at both said ends with one guiding carriage each,
   the improvement comprising the guiding carriages of two adjacent-positioned panels can be moved into positions in which the guiding carriages are at least partly positioned side-by-side with each other, the guiding rails feature at least two parallel guiding tracks, and the guiding carriages of said two adjacent-positioned panels are each positioned in a different one of said guiding tracks, a link is provided that is positioned in the driving direction on the back side of a front guiding carriage and that engages at least partially the adjacent guiding tracks and that features a recess; and in that a protruding elastic engaging element is provided on the front side of the following backward guiding carriage.

8. The guiding mechanism of claim 7, wherein:
   the engaging element is configured as a leaf spring, the front end of which features an upwardly bent protruding tip and a catch nose that is directed downward and presses under prestress against the bottom surface of the guiding track,
   the catch nose engages a recess in the bottom surface of the guiding track when the panels are in the position that closes the vehicle sunroof,
   the protruding tip of the engaging element engages the front guiding carriage recess during compaction when the vehicle sunroof is opened and in that it is lifted up by the catch nose that, with further pushing back the catch nose moves out of the bottom surface recess of the guiding track and rests on the bottom surface of the guiding track, and
   that the catch nose of the engaging element engages the guiding track recess at a predetermined position during extension when the vehicle sunroof is being closed thereby disengaging the protruding tip from the front guiding carriage recess.

9. A guiding mechanism for a vehicle sunroof having at least three panels including:
   a roof-mounted frame forming a generally rectangular opening in the roof of the vehicle,
   said at least three panels including a first panel, a second panel rearward of and adjacent to said first panel, a third panel rearward of and adjacent to said second panel;
   guiding rails that are positioned along the edges of the frame and are generally parallel with the driving direction of the vehicle, each of said guiding rails having only two parallel guiding tracks, said only two guiding tracks being a first and a second guiding track;
   guiding carriages that can be moved back and forth in one of said two guiding tracks, whereas said at least three panels have laterally spaced ends and are connected at both said ends with one guiding carriage each; and
   said guiding carriages of said first panel and said third panels moving in said first guiding track, said guiding carriages of said second panel moving in said second guiding track, said guiding carriages of two adjacent-positioned panels can be moved into positions in which the guiding carriages are at least partly positioned side-by-side with each other while said guiding carriages of said first panel is in front of said guiding carriages of said third panel in said first guiding track.

10. A guiding mechanism for a vehicle sunroof having at least two panels including:
   a roof-mounted frame forming a generally rectangular opening in the roof of the vehicle;
   said at least two panels each having a front edge generally facing the driving direction of the vehicle and an opposite rear edge defining a width of said panels, said at least two panels each having laterally spaced ends defining a length of said panels, said length of each said panel being substantially equal,
   guiding rails that are positioned along the edges of the frame and are generally parallel with the driving direction of the vehicle, and
   guiding carriages that can be moved back and forth in the guiding rails, whereas the panels are connected at both said ends with one guiding carriage each, said guiding carriages of two adjacent-positioned panels can be moved into positions in which the guiding carriages are at least partly positioned side-by-side with each other.

* * * * *